United States Patent
Shiraki

(10) Patent No.: US 9,832,041 B2
(45) Date of Patent: Nov. 28, 2017

(54) SWITCH DEVICE AND CONTROL METHOD OF SWITCH DEVICE

(71) Applicant: FUJITSU LIMITED, Kawasaki-shi, Kanagawa (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 14/807,404

(22) Filed: Jul. 23, 2015

(65) Prior Publication Data

US 2015/0333928 A1 Nov. 19, 2015

Related U.S. Application Data

(63) Continuation of application No. PCT/JP2014/058944, filed on Mar. 27, 2014.

(30) Foreign Application Priority Data

Mar. 27, 2013 (JP) ................................ 2013-067601

(51) Int. Cl.
*H04L 12/46* (2006.01)
*H04L 12/24* (2006.01)
*H04L 12/66* (2006.01)

(52) U.S. Cl.
CPC ...... *H04L 12/4675* (2013.01); *H04L 12/4625* (2013.01); *H04L 12/4641* (2013.01); *H04L 12/66* (2013.01); *H04L 41/0853* (2013.01)

(58) Field of Classification Search
CPC ............ H04L 12/4675; H04L 12/4625; H04L 41/0853; H04L 12/66; H04L 12/4641
(Continued)

(56) References Cited

U.S. PATENT DOCUMENTS 7,796,614 B1 *  9/2010  Weymans ........... H04L 12/4625
                                                370/395.4
8,756,344 B2 *  6/2014  Waldrop ............ G06Q 30/0611
                                                709/223
(Continued)

FOREIGN PATENT DOCUMENTS

JP     2003-234750      8/2003
JP     2003-318936      11/2003
(Continued)

OTHER PUBLICATIONS

Japanese Office Action mailed Jul. 12, 2016 for corresponding Japanese Patent Application No. 2013-067601, with Partial English Translation, 6 pages. **Please note JP-2012-114894, JP-2003-324462, JP-2003-234750, JP-2012-244621 and JP-2012-249153 cited herewith, were previously cited in an IDS filed on Jul. 23, 2015.

(Continued)

*Primary Examiner* — Christine Ng
(74) *Attorney, Agent, or Firm* — Fujitsu Patent Center

(57) ABSTRACT

To provide a switch device and a control method of the switch device which reduce a burden on a manager in an FCoE communication. A switch device relays the FCoE communication between a storage and a server disposed in an internal network and a FCF disposed in an external network. A reception port receives, from the FCoE, information of an external VLAN in the external network in response to a transmission request for information of a virtual network used in the FCoE communication. A protocol processing unit selects an internal VLAN, corresponding to the external VLAN, in the internal network. A transmission port notifies an end node of information of the internal VLAN as information of the VLAN used in the FCoE communication. A packet processing unit relays the FCoE (Continued)

communication between the end node and the FCF based on the internal VLAN and the external VLAN.

6 Claims, 17 Drawing Sheets

(58) Field of Classification Search
USPC .................................. 370/389, 392, 401, 465
See application file for complete search history.

(56) References Cited

U.S. PATENT DOCUMENTS

| | | | |
|---|---|---|---|
| 2003/0172188 | A1 | 9/2003 | Hasegawa et al. |
| 2004/0019702 | A1 | 1/2004 | Kojima et al. |
| 2011/0142062 | A1* | 6/2011 | Wang ...................... H04L 12/66 370/401 |
| 2011/0299539 | A1* | 12/2011 | Rajagopal ........... H04L 12/4675 370/395.53 |
| 2012/0106957 | A1* | 5/2012 | Willeke ............ H04L 29/12207 398/58 |
| 2012/0179776 | A1 | 7/2012 | Umezuki |
| 2012/0275787 | A1* | 11/2012 | Xiong ................... H04L 49/357 398/45 |
| 2012/0294192 | A1 | 11/2012 | Masood et al. |
| 2012/0307627 | A1 | 12/2012 | Oyamada |
| 2013/0223450 | A1* | 8/2013 | Kamiya .................... H04L 1/18 370/392 |
| 2013/0311623 | A1* | 11/2013 | Kanada ............... H04L 41/0806 709/221 |

FOREIGN PATENT DOCUMENTS

| | | |
|---|---|---|
| JP | 2003-324462 | 11/2003 |
| JP | 2008-227695 | 9/2008 |
| JP | 2012-114894 | 6/2012 |
| JP | 2012-147218 A | 8/2012 |
| JP | 2012-244621 | 12/2012 |
| JP | 2012-249153 | 12/2012 |

OTHER PUBLICATIONS

Extended European Search Report mailed on Feb. 12, 2016 for corresponding European Patent Application No. 14774186.2, 7 pages. **Please note JP-2012-114894-A, US-2013/0223450-A1 and US-2004/0019702-A1 cited herein, were previously cited in an IDS filed on Jul. 23, 2016.

International Search Report and Written Opinion of the International Searching Authority (Form PCT/ISA/210, Form PCT/ISA/237), mailed in connection with PCT/JP2014/058944 and mailed Jun. 10, 2014 (9 pages).

Japanese Office Action mailed Jan. 10, 2017 for corresponding Japanese Patent Application No. 2013-067601, with Partial English Translation, 4 pages. **Please note all references cited herewith, were previously cited in an IDS filed on Jul. 23, 2015 and Aug. 11, 2016, respectively.

* cited by examiner

FIG.4

| Match | | | | | ACTION |
|---|---|---|---|---|---|
| RECEPTION PORT | DESTINA-TION MAC | TRANS-MISSION SOURCE MAC | VID | TYPE | |
| PORT OTHER THAN INTERNAL PORT | * | * | * | FIP | FORWARD TO INTERNAL PORT |
| EXTERNAL NETWORK PORT | * | * | 1000 | FCoE | CHANGE VID TO 100 |
| INTERNAL NETWORK PORT | * | * | 100 | FCoE | CHANGE VID TO 1000 |
| * | * | ALLOWED MAC | * | * | ALLOW |
| * | * | * | * | * | REJECT (DISCARD) |

Table 104

FIG.5

| INTERNAL VLAN | EXTERNAL VLAN |
|---|---|
| 100 | 1000 |
| 110 | 1010 |
| ⋮ | ⋮ |

201 — 202, Table 112

FIG.12A

| INACTIVE VLAN | ACTIVE VLAN |
|---|---|
| 120 | 100 |
| 130 | 110 |
| ⋮ | ⋮ |

401

→

| INACTIVE VLAN | ACTIVE VLAN |
|---|---|
| 130 | 100 |
| ⋮ | 110 |
| ⋮ | 120 |
| ⋮ | ⋮ |

| TYPE | INTERNAL VLAN | EXTERNAL VLAN |
|---|---|---|
| Static | 100 | 1000 |
| Static | 110 | 1010 |
| ⋮ | ⋮ | ⋮ |

→

112

| TYPE | INTERNAL VLAN | EXTERNAL VLAN |
|---|---|---|
| Static | 100 | 1000 |
| Static | 110 | 1010 |
| Dynamic | 120 | 1020 |
| ⋮ | ⋮ | ⋮ |

403   404   405

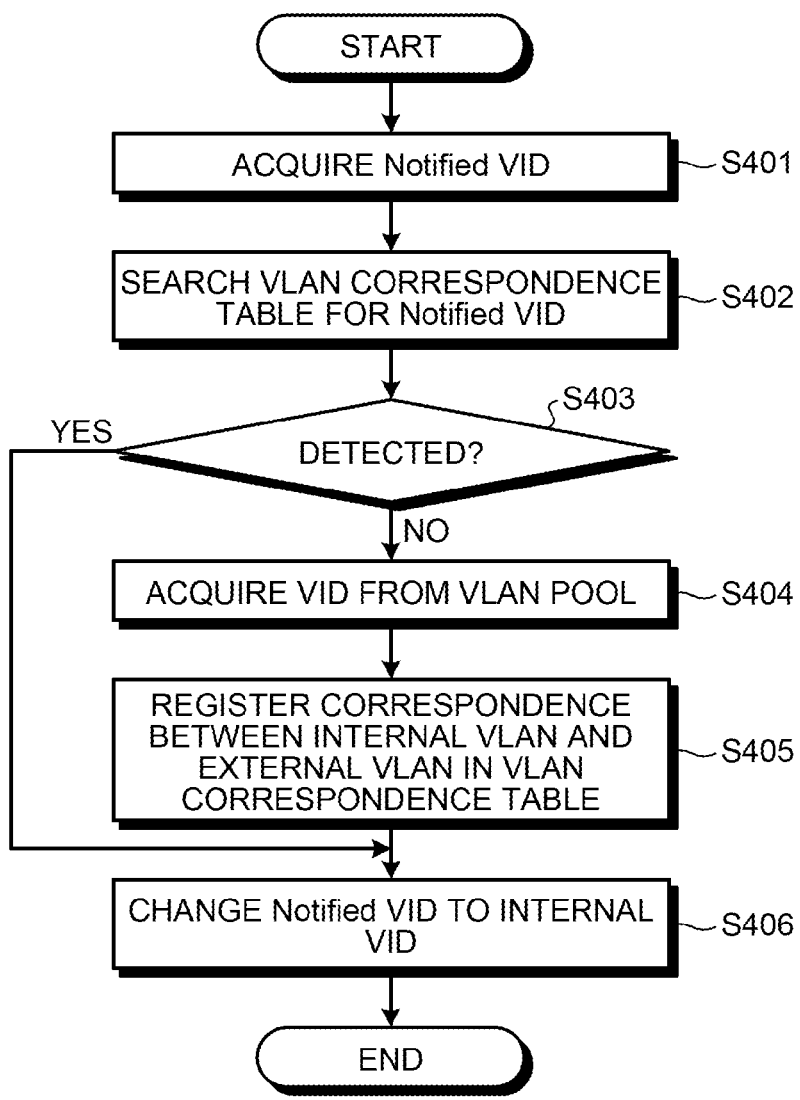

FIG.15A

| MAC ADDRESS | INACTIVE VLAN | ACTIVE VLAN |
|---|---|---|
| 00-00-0E-11-22-01 | 120 | 100 |
| | ⋮ | 110 |
| 00-00-0E-11-22-02 | 150 | - |
| | ⋮ | - |
| ⋮ | ⋮ | ⋮ |

| MAC ADDRESS | FPMA | TYPE | INTERNAL VLAN | EXTERNAL VLAN |
|---|---|---|---|---|
| 00-00-0E-11-22-01 | 0E-FC-00-00-00-01 | Static | 100 | 1000 |
| 00-00-0E-11-22-02 | φ | Dynamic | 150 | 1050 |
| ⋮ | ⋮ | ⋮ | ⋮ | ⋮ |

501     502     503     504     505

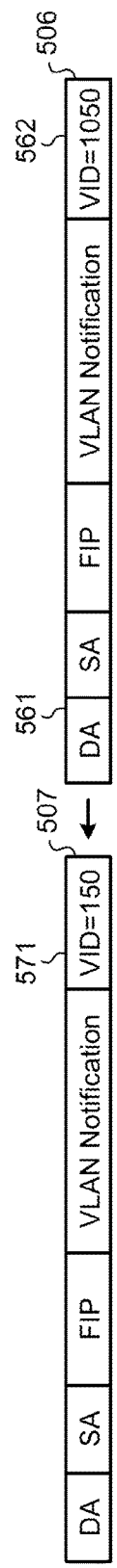

SWITCH DEVICE AND CONTROL METHOD OF SWITCH DEVICE

This application is continuation application of International Application PCT/JP2014/058944 filed on Mar. 27, 2014 and designating the U.S., the entire contents of which are incorporated herein by reference. This application is based upon and claims the benefit of priority of the prior Japanese Patent Application No. 2013-067601, filed on Mar. 27, 2013, the entire contents of which are incorporated herein by reference.

FIELD

The present invention relates to a switch device and a control method of the switch device.

BACKGROUND

Storage communication is requested to have a higher communication performance than inter-server communication in order to transfer large amount of data. Therefore, conventionally, networks for the storage communication and the inter-server communication have been independently provided.

Here, the inter-server communication network is, for example, a local area network (LAN). In the LAN, the Ethernet (registered trademark) is mainly used as a communication standard. Alternatively, the storage communication network is called a storage area network (SAN). In the SAN, a Fibre Channel (FC) is used as a standard.

On the other hand, accelerating of the Ethernet has progressed recently. Therefore, an integrated network in which the inter-server communication and the storage communication are integrated can be implemented. A technique for implementing the integrated network is, for example, a fibre channel over Ethernet (FCoE) which is the technique for handling, in the Ethernet, an FC packet which is the standard of the SAN.

The specification to detect a virtual LAN (VLAN) used in the FCoE is defined as the FCoE initialization protocol (FIP) VLAN Discovery. In accordance with the FIP VLAN Discovery, the storage communication traffic and the inter-server communication traffic can be separately handled in the FCoE. The FIP is a protocol to handle a virtual link corresponding to an FC link on the Ethernet. Hereinafter, the VLAN used in the FCoE is referred to as an "FCoE VLAN".

In the procedures of the FIP VLAN Discovery, first, an end node, such as a server or a storage, transmits an FIP VLAN Request packet to a network in order to discover the FCoE VLAN. In the FIP VLAN Request packet communication, a default VLAN set to the network in advance is used.

Then, the FCoE VLAN Request packet arrives at an FCoE Forwarder (FCF) which switches the FCoE packet via the network. The FCF returns an FIP VLAN Notification packet in response to the FCoE VLAN Request. The FIP VLAN Notification packet stores a VID (VLAN Identifier) of the VLAN used in the FCoE communication.

The FIP VLAN Notification packet transmitted by the FCF arrives at an end node which is the transmission source of the FIP VLAN Request via the network. The end node, which receives the FIP VLAN Notification packet, uses the VLAN having the VID stored in the received FIP VLAN Notification packet as the FCoE VLAN in the subsequent FCoE communication.

Here, as a VLAN technique, there is a conventional technique which converts a VID and connects a different VLAN, for example, in which a VID used in an area network is associated with a VID used in a wide area network, and the VID is converted to perform communication between the area network and the wide area network.

Furthermore, there is a conventional technique which mutually converts a VLAN tag in a user's home and a common tag used in a backbone.

Patent Literature 1: Japanese Laid-open Patent Publication No 2003-324462
Patent Literature 2: Japanese Laid-open Patent Publication No 2003-234750
Patent Literature 3: Japanese Laid-open Patent Publication No 2003-318936
Patent Literature 4: Japanese Laid-open Patent Publication No 2008-227695

However, in a system including a network, a server manager, a server-peripheral internal network manager, and an external network manager may be different. Furthermore, the FCF may exist in the external network.

In order to perform the FCoE communication with this configuration, it is preferable that the FCoE VLAN used in the internal network corresponds to the FCoE VLAN used in the external network. This is because the packet used for the FIP VLAN Discovery is exchanged over the management boundary, and the end node existing in the internal network uses, in the FCoE communication, the FCoE VLAN notified by the FCF existing in the external network.

Here, it is difficult for the internal network manager to perform the settings of the external network. Therefore, when the FCoE VLAN used in the internal network is associated with the FCoE VLAN used in the external network, the internal network manager sets the FCoE VLAN of the internal network to the FCoE VLAN of the external network. In this manner, when the FCoE VLAN used in the internal network is associated with the FCoE VLAN used in the external network, the degree of freedom of the FCoE VLAN used in the internal network is restricted and the burden on the manager increases. In addition, the external network manager and the internal network manager can adjust the settings of the FCoE VLAN. However, even with this method, it is difficult to reduce the burden on the manager.

In this regard, the conventional technique which converts a VID and connect a different VLAN does not consider the FCoE. Therefore, it is difficult to connect a different FCoE VLAN based on the procedures of the FIP VLAN Discovery, and it is difficult to reduce the burden on the manager in the FCoE communication. Similarly, the conventional technique which mutually converts a VLAN tag in a user's home and a common tag used in a backbone does not consider the FCoE, and it is difficult to reduce the burden on the manager.

SUMMARY

According to an aspect of an embodiment, a switch device relays communication between a first device disposed in a first network and a second device disposed in a second network in order for data in accordance with a first communication technology to be transmitted and received on a network in accordance with a second communication technology. The switch device includes: a reception unit that receives, from the second device, information of a second virtual network in the second network in response to a transmission request for information of a virtual network used in the communication; a selection unit that selects a first virtual network, corresponding to the second virtual network, in the first network; a notification unit that notifies the first device of information of the first virtual network selected by the selection unit as information of a virtual network used in the communication; and a relay unit that relay the communication between the first device and the second device based on the first virtual network and the second virtual network.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating of an example of an ACL.

FIG. 5 is a diagram illustrating an example of a VLAN correspondence table according to the first embodiment.

FIG. 12A is a diagram describing a usage example of a VLAN pool according to the second embodiment.

FIG. 12B is a diagram describing a usage example of a VLAN correspondence table according to the second embodiment.

FIG. 13 is a flowchart illustrating the FIP VLAN Notification VLAN conversion processing according to the second embodiment.

FIG. 15A is a diagram illustrating an example of a VLAN pool according to the third embodiment.

FIG. 15B is a diagram illustrating an example of a VLAN correspondence table according to the third embodiment.

FIG. 15C is a diagram illustrating an example of a VLAN Notification packet to describe a change of a Notified VID according to the third embodiment.

DESCRIPTION OF EMBODIMENTS

Hereinafter, a switch device and a control method of the switch device disclosed in the application will be described in detail with reference to the drawings. Note that, the switch device and the control method of the switch device disclosed in the application are not limited by the following embodiments.

[a] First Embodiment

Figure 1:
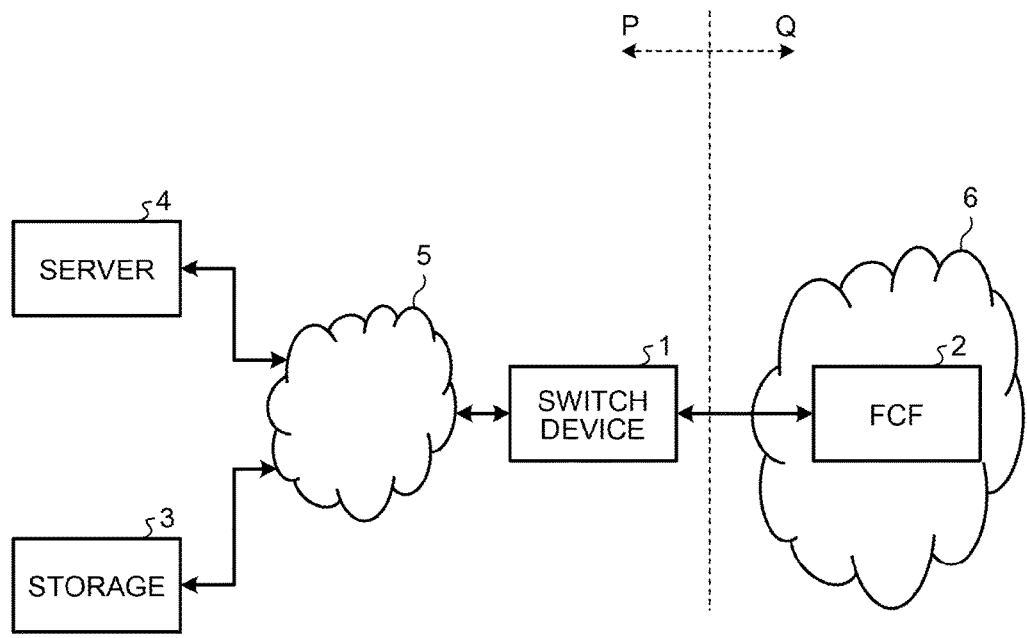
FIG. 1 is a diagram illustrating a schematic configuration of an example of a communication network system using an FCoE.

FIG. 1 is a diagram illustrating a schematic configuration of an example of a communication network system using an FCoE. As illustrated in FIG. 1, a communication network system according to the present embodiment includes a switch device 1, an FCF 2, a storage 3, and a server 4.

The storage 3 and the server 4 are connected to an internal network 5. The internal network 5 is a peripheral network of the storage 3 and the server 4, for example, in a base of a company having a plurality of bases.

The FCF 2 is disposed in an external network 6. The external network 6 is, for example, a core network which connects the bases.

The switch device 1 is disposed at the position where the internal network 5 is connected to the external network 6. That is, the switch device 1 is disposed between the internal network 5 and the external network 6.

Each of the internal network 5 and the external network 6 is managed by a different manager. A dotted line in FIG. 1 indicates the management boundary. That is, arrow P side from the dotted line is managed by a manager of the internal network 5. Alternatively, arrow Q side from the dotted line is managed by a manager of the external network 6. Therefore, in the present embodiment, the VID in the internal network 5 and the VID in the external network 6 are managed by the respective managers.

The storage 3 and the server 4 communicate with each other using the FCoE. More specifically, first, the storage 3 and the server 4 request the FCF 2 to initialize a fiber channel.

Then, the switch device 1 and the FCF 2 determine a VID of a VLAN used by the storage 3 and the server 4. The operation of the switch device 1 and the determination of the VID will be described in detail later. After the VID is determined, the storage 3 and the server 4 transmit and receive a packet using the FCoE via the switch device 1 and the FCF 2.

Figure 2:
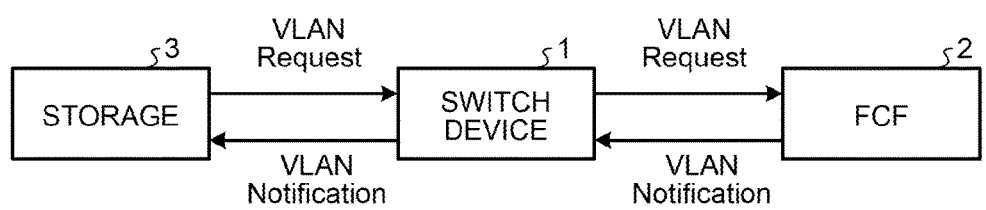
FIG. 2 is a diagram describing procedures to initialize the FCoE.

Here, with reference to FIG. 2, the initialization of the FCoE in the network system according to the present embodiment will be briefly described. FIG. 2 is a diagram describing the procedures to initialize the FCoE. FIG. 2 illustrates an example in which the storage 3 uses the FCoE.

To initialize the FCoE, an FIP, which is a protocol for initializing the FCoE, is used. First, the storage 3 transmits, to the switch device 1, a VLAN Request which is a command to request the FCF 2 of a VLAN used in the FCoE by using a VLAN of the internal network 5. The VLAN Request is broadcasted using a predetermined VID for requesting the initialization. The VID for requesting the initialization is common to the internal network 5 and the external network 6.

The switch device 1 transmits, to the FCF 2, the VLAN Request transmitted from the storage 3 via the external network 6.

The FCF 2 receives the VLAN Request from the storage 3. Then, the FCF 2 selects the VLAN to be used by the storage 3 in the external network 6. Then, the FCF 2 generates a packet of a VLAN Notification which stores the VID of the selected VLAN in the header. Then, the FCF 2 transmits a VLAN Notification via the external network 6 to the switch device 1 in order to notify the storage 3 of the VID to be used in the external network 6. Hereinafter, the VID, which is stored in the header of the VLAN Notification, notified by the FCF 2, and to be used in the external network 6, is also referred to as a "Notified VID".

The switch device 1 receives the VLAN Notification transmitted from the FCF 2. Then, the switch device 1 converts the Notified VID stored in the VLAN Notification into the VID to be used in the internal network 5 and transmits the converted VID via the internal network 5 to the storage 3.

The storage 3 receives the VLAN Notification, and acquires the VID stored in the VLAN Notification. Next, the storage 3 logs into a fabric by performing a fabric login (FLOGI), a fabric discovery, or the like using the acquired VID. Thereafter, the storage 3 performs the FCoE communication with another device via the FCF 2 using the VID acquired similarly. Hereinafter, data or commands which are transmitted/received in the FCoE communication other than the initialization of the FCoE are referred to as "actual FCoE communication data".

Figure 3:
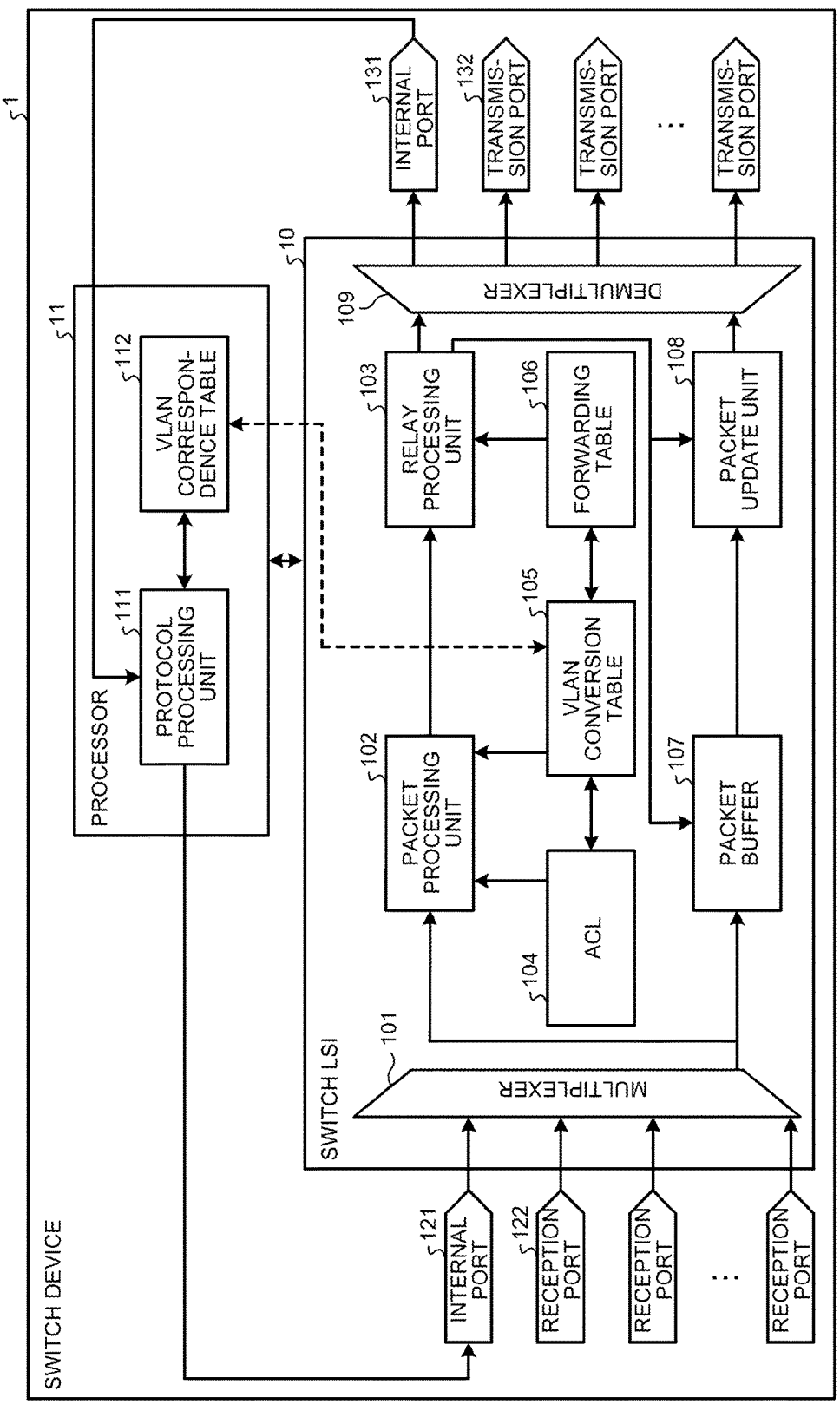
FIG. 3 is a block diagram illustrating a switch device according to a first embodiment.

FIG. 3 is a block diagram illustrating the switch device according to the first embodiment. The switch device 1 includes a switch large scale integration (LSI) 10 and a processor 11. The switch device 1 further includes an internal port 121, a reception port 122, an internal port 131, and a transmission port 132.

The internal port 121 receives a packet output from the processor 11 and outputs the packet to the switch LSI 10.

A plurality of reception ports 122 are disposed. Each of the reception ports 122 is connected to either of the internal network 5 or the external network 6. The reception port 122 connected to the internal network 5 receives a packet from, for example, the storage 3 and the server 4 via the internal network 5. Alternatively, the reception port 122 connected to the external network 6 receives a packet from, for example, the FCF 2 via the external network 6. In the following description, the reception port 122 connected to the internal network 5 and the reception port 122 connected to the external network 6 will be described without distinguishing between them. The reception port 122 outputs the received packet to the switch LSI 10. Hereinafter, the packed received at either of the internal port 121 or the reception port 122 is also referred to as a "received packet".

The internal port 131 receives the packet output from the switch LSI 10 and outputs the packet to the processor 11.

A plurality of transmission ports 132 is disposed. Each of the transmission ports 132 is connected to either of the internal network 5 or the external network 6. The transmission port 132 receives the packet output from the switch LSI 10. The transmission port 132 connected to the internal network 5 transmits the packet to, for example, the storage 3 and the server 4 via the internal network 5. Alternatively, the transmission port 132 connected to the external network 6 transmits the packed to, for example, the FCF 2 via the external network 6. In the following description, the transmission port 132 connected to the internal network 5 and the transmission port 132 connected to the external network 6 will be described without distinguishing between them.

The switch LSI 10 includes a multiplexer 101 and a demultiplexer 109. The switch LSI 10 further includes a packet processing unit 102, a relay processing unit 103, an access control list (ACL) 104, a VLAN conversion table 105, a forwarding table 106, a packet buffer 107, and a packet update unit 108.

The multiplexer 101 receives, from the internal port 121 and the reception ports 122, the input of the received packet. The multiplexer 101 acquires header information from the received packet. The multiplexer 101 outputs the acquired header information to the packet processing unit 102. The multiplexer 101 further outputs the received packet to the packet buffer 107. Moreover, the multiplexer 101 outputs, to the packet processing unit 102, information of a port which receives the received packet storing the acquired header information.

The ACL 104 is a list used to determine, from the information stored in the header information, the control performed to the received packet storing the header information. The ACL 104 includes, for example, the contents illustrated in FIG. 4. FIG. 4 is a diagram illustrating an example of the ACL. In the items in the ACL 104 of FIG. 4, a reception port indicates the port to which the received packet is input. A destination MAC indicates the media access control (MAC) address which is the transmission destination of the received packet. A transmission source MAC indicates the MAC address which is the transmission source of the received packet. A VID indicates the VID registered in the received packet. A type indicates the type of the received packet. Types of the packet are, for example, the FIP and the FCoE. An action indicates processing to be performed to the packet in which the conditions match items included in "Match".

The description returns back to FIG. 3. In the VLAN conversion table 105, the correspondence between the VIDs used in both of the internal network 5 and the external network 6 when the packet is transferred between the networks is written. In the VLAN conversion table 105, a VLAN correspondence table 112, which will be described later, is copied to the switch LSI 10 by a protocol processing unit 111. That is, the contents of the VLAN conversion table 105 is the same as that of the VLAN correspondence table 112. The detailed contents of the VLAN conversion table 105 will be described later together with the VLAN correspondence table 112.

The packet processing unit 102 receives, from the multiplexer 101, the header information stored in the received packet received at the internal port 121 or the reception ports 122. The packet processing unit 102 further receives, from the multiplexer 101, the information of the port which receives the received packet storing the received header information. Then, the packet processing unit 102 acquires, from the ACL 104, the operation according to the header information and the information of the port which receives the received packet. For example, when the received packet is received at the reception port 122 other than the internal port 121, and the type of the received packet is the FIP, the packet processing unit 102 transfers the received packet to the internal port 131. The operation of the packet processing performed by the packet processing unit 102 using the ACL 104 will be described in detail below.

The packet processing unit 102 determines whether or not the port, which receives the received packet storing the received header information, is the internal port 121. When the receiving port is the internal port 121, the packet processing unit 102 acquires the destination MAC from the header information. Then, the packet processing unit 102 notifies the relay processing unit 103 of the instruction to transmit the packet to the destination MAC.

Alternatively, when the receiving port is not the internal port 121, the packet processing unit 102 acquires the type of the received packet from the header information. Then, the packet processing unit 102 determines whether or not the received packet is the FIP.

When the received packet is the FIP, the packet processing unit 102 notifies the relay processing unit 103 of the instruction to output the packet to the internal port 131.

When the received packet is not the FIP, the packet processing unit 102 determines whether the received packet is received at the reception port 122 connected to the external network 6 or at the reception port 122 connected to the internal network 5. When the received packet is received at the reception port 122 connected to the external network 6, the packet processing unit 102 acquires the VID, which is stored in the VLAN tag of the header information stored in the received packet, in the external network 6. Hereinafter, the VID, which is stored in the VLAN tag of the packet used in the actual FCoE communication, in the external network 6 is also referred to as an "external VID". Similarly, the VID, which is stored in the VLAN tag of the packet used in the actual FCoE communication, in the internal network 5 is also referred to as an "internal VID". The packet processing unit 102 acquires, from the VLAN conversion table 105, the internal VID corresponding to the acquired external VID. Then, the packet processing unit 102 rewrites, to the acquired internal VID, the external VID stored in the VLAN tag of the header information stored in the received packet. The packet processing unit 102 further acquires the destination MAC address from the header information. Thereafter, the packet processing unit 102 outputs, to the relay processing unit 103, the header information in which the VLAN tag is rewritten and further instructs the relay processing unit 103 to transmit the received packet to the destination MAC address.

On the other hand, when the received packet is received at the reception port 122 connected to the internal network 5, the packet processing unit 102 acquires the internal VID stored in the VLAN tag of the header information stored in the received packet. The packet processing unit 102 acquires, from the VLAN conversion table 105, the external VID corresponding to the acquired internal VID. Then, the packet processing unit 102 rewrites the internal VID stored in the VLAN tag of the header information stored in the received packet to the acquired external VID. The packet processing unit 102 further acquires the destination MAC address from the header information. Thereafter, the packet processing unit 102 outputs, to the relay processing unit 103, the header information in which the VLAN tag is rewritten and instructs the relay processing unit 103 to transmit the packet to the destination MAC address.

The forwarding table 106 stores path information to the destination in a delivery of the packet.

When the received packet is input from the internal port 121, the relay processing unit 103 receives, from the packet processing unit 102, the instruction to transmit the packet to the destination MAC address together with the information of the destination MAC address. Then, the relay processing unit 103 acquires, from the forwarding table 106, the path information to the destination MAC address. For example, the relay processing unit 103 acquires the information to output the received packet to which one of the transmission ports 132. Then, the relay processing unit 103 notifies the demultiplexer 109 of the information of the transmission port 132 connected to the acquired path.

When the received packet is the FIP, the relay processing unit 103 receives, from the packet processing unit 102, the instruction to output the packet to the internal port 131. Then, the relay processing unit 103 notifies the demultiplexer 109 of the information of the internal port 131 in order for the demultiplexer 109 to transmit the received packet to the internal port 131.

Furthermore, when the received packet is the packet used in the actual FCoE communication, the relay processing unit 103 receives, from the packet processing unit 102, the instruction to transmit the received packet to the destination MAC address together with the header information and the destination MAC address. Then, the relay processing unit 103 outputs the header information to the packet update unit 108. The relay processing unit 103 further acquires, from the forwarding table 106, the path information to the destination MAC address. Then, the relay processing unit 103 notifies the demultiplexer 109 of the information of the transmission port 132 connected to the acquired path.

The packet buffer 107 receives, from the multiplexer 101, the input of the received packet. The packet buffer 107 synchronizes, based on the instruction from the relay processing unit 103, the timing when the received packet is output to the packet update unit 108 with the timing when the header information stored in the received packet is input from the relay processing unit 103 to the packet update unit 108. The packet buffer 107 is, for example, a random access memory (RAM) circuit. Then, after receiving the instruction from the relay processing unit 103, the packet buffer 107 outputs the received packet to the packet update unit 108.

The packet update unit 108 receives, from the packet buffer 107, the input of the received packet. The packet update unit 108 further receives, from the relay processing unit 103, the input of the header information stored in the received packet. Then, the packet update unit 108 changes the VLAN tag of the header information stored in the received packet. Here, when the received packet is the packet used in the actual FCoE communication, the packet processing unit 102 converts the VLAN tag. Thus, when the received packet is the transmission packet used in the actual FCoE communication, the packet update unit 108 changes the VLAN tag. Then, the packet update unit 108 outputs the received packet to the demultiplexer 109.

The demultiplexer 109 receives, from the packet update unit 108, the input of the received packet. The demultiplexer 109 further receives, from the relay processing unit 103, the input of the information of the port, which outputs the received packet, among the internal port 131 and the transmission ports 132. Then, the demultiplexer 109 outputs the received packet to the port designated by the relay processing unit 103.

For example, when the received packet is received at the internal port 121, the demultiplexer 109 outputs the received packet to the transmission port 132 which connects to the destination MAC address designated by the received packet. Alternatively, when the received packet is the transmission packet used in the actual FCoE communication, the demultiplexer 109 outputs the received packet to the transmission port 132 which connects to the destination MAC address. On the other hand, when the received packet is the FIP and received at the reception port 122, the demultiplexer 109 outputs the received packet to the internal port 121.

The processor 11 includes the protocol processing unit 111 and the VLAN correspondence table 112.

FIG. 5 is a diagram illustrating an example of the VLAN correspondence table according to the first embodiment. In the VLAN correspondence table 112 according to the present embodiment, as illustrated in FIG. 5, the correspondence between the VID of the internal VLAN and the VID of the external VLAN is registered in advance. That is, in the present embodiment, the internal VLAN corresponding to the external VLAN has been determined. For example, in the VLAN correspondence table 112 of FIG. 5, an internal VLAN 201 in which the VID is 100 corresponds to an external VLAN 202 in which the VID is 1000.

The protocol processing unit 111 receives, from the internal port 131, the input of the received packet in which the packet type is the FIP.

Then, the protocol processing unit 111 determines that the received packet is which one of the VLAN Request, the VLAN Notification, the FLOGI ACC, or the FDISC ACC.

When the packet is any one of the VLAN Request, the FLOGI ACC, or the FDISC ACC, the protocol processing unit 111 outputs the packet to the internal port 121.

On the other hand, when the packet is the VLAN Notification, the protocol processing unit 111 acquires the Notified VID from the FCF 2. Then, the protocol processing unit 111 acquires, from the VLAN correspondence table 112, the internal VID corresponding to the acquired Notified VID. Then, the protocol processing unit 111 changes, to the acquired internal VID, the Notified VID stored in the received packet which is the VLAN Notification.

Figure 6:
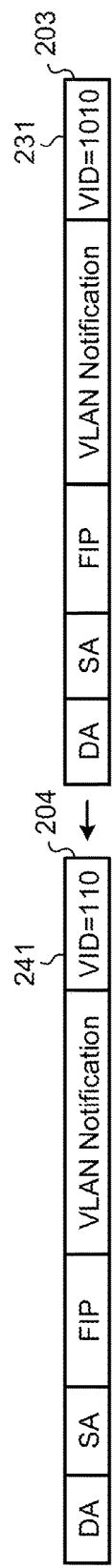
FIG. 6 is a diagram illustrating an example of a change of a Notified VID by a protocol processing unit.

FIG. 6 is a diagram illustrating an example of a change of the Notified VID by the protocol processing unit. Here, the case where the protocol processing unit 111 uses the VLAN correspondence table 112 of FIG. 5 will be described.

The protocol processing unit 111 receives a received packet 203 which is the VLAN Notification. Then, the protocol processing unit 111 acquires a VID 231 which is the Notified VID and stored in the received packet 203. The VID 231 is the external VID. Therefore, the protocol processing unit 111 acquires, from the VLAN correspondence table 112, the internal VLAN corresponding to the acquired VID 231. Here, the VID 231 is 1010, and the protocol processing unit 111 acquires 110 as the internal VID from the VLAN correspondence table 112. Then, the protocol processing unit 111 changes the VID 231 stored in the received packet 203 to the acquired internal VID. Thus, the protocol processing unit 111 generates a packet 204 in which 110 is stored as a Notified VID 241.

Then, the protocol processing unit 111 outputs, to the internal port 121, the received packet which is the VLAN Notification and in which the Notified VID is changed.

Furthermore, when the VLAN correspondence table 112 is generated for the first time, or When the contents of the VLAN correspondence table 112 is updated, the protocol processing unit 111 copies the contents of the VLAN correspondence table 112 to the VLAN conversion table 105. That is, the VLAN correspondence table 112 and the VLAN conversion table 105 have the same contents.

Figure 7:
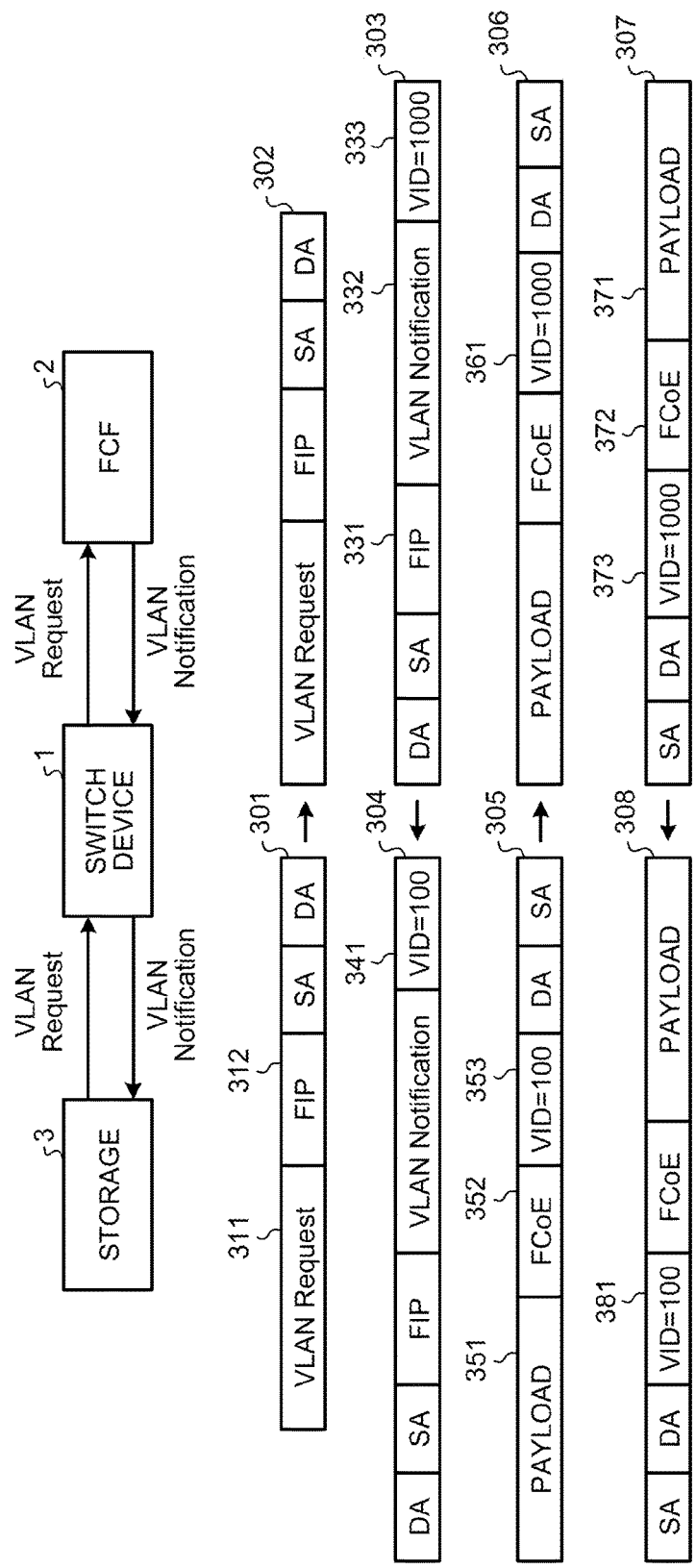
FIG. 7 is a diagram describing packet conversion by the switch device.

Moreover, with reference to FIG. 7, the overall procedures of packet conversion by the switch device 1 will be described. FIG. 7 is a diagram describing the packet conversion by the switch device.

At the top of FIG. 7, the devices are illustrated to be easily understood. It is assumed that each packet is exchanged between the devices corresponding to the devices illustrated on the top in the direction of an arrow. For example, a packet 301 is output from the storage 3, converted into a packet 302 by the switch device 1, and input to the FCF 2.

The packet 301 is the VLAN Request packet output from the storage 3. The switch device 1 confirms that the packet is the FIP from a type 312 stored in the packet 301. The switch device 1 further confirms that the packet is the VLAN Request from an identification information 311. Then, the switch device 1 does not change the packet 301 and outputs the packet to the FCF 2 as the packet 302.

The FCF 2 which receives the packet 302 acquires the VID to be used in the external network 6 and generates a packet 303 which is the VLAN Notification. Then, the FCF 2 outputs the packet 303 to the switch device 1. The switch device 1 confirms that the packet is the FIP from a type 331 stored in the packet 303. The switch device 1 further confirms that the packet is the VLAN Notification from an identification information 332. Then, the switch device 1 acquires the information of a Notified VID 333 from the packet. Next, the switch device 1 acquires, from the VLAN correspondence table 112, the internal VID corresponding to the acquired Notified VID 333 and rewrites the Notified VID 333 to the acquired internal VID. Thus, the switch device 1 generates a packet 304 storing a Notified VID 341. Then, the switch device 1 outputs the packet 304 to the storage 3.

The storage 3 confirms the Notified VID stored in the received packet 304 and acquires the information of the internal VID to be used. Thereafter, although the login to the fabric is performed actually, the description is omitted here. Thereafter, the storage 3 generates a transmission packet 305 to be used in the actual FCoE communication. A payload 351 of the packet 305 stores the data to be transmitted. A type 352 of the packet 305 is the FCoE. A VLAN tag 353 stores the internal VID notified as the Notified VID. The storage 3 outputs the generated packet 305 to the switch device 1. The switch device 1 receives the packet 305 and confirms that the packet type is the FCoE from the type 352. Then, the switch device 1 acquires, from the VLAN conversion table 105, the external VID corresponding to the internal VID stored in the VLAN tag 353 of the packet 305. Then, the switch device 1 changes the VLAN tag 353 of the packet 305 to the acquired external VID and generates a packet 306 storing a VID 361. Thereafter, the switch device 1 outputs the packet 306 to the FCF 2.

Alternatively, when the data is transmitted from other device, such as the server 4 of FIG. 1, to the storage 3 in the FCoE, the FCF 2 outputs a packet, such as a packet 307, to the switch device 1. A payload 371 of the packet 307 stores the data to be transmitted. A type 372 of the packet 307 is the FCoE. The VLAN tag 373 stores the external VID. The switch device 1 receives the packet 307 and confirms that the packet type is the FCoE from the type 372. Then, the switch device 1 acquires, from the VLAN conversion table 105, the internal VID corresponding to the external VID stored in the VLAN tag 373 of the packet 307 Then, the switch device 1 changes the VLAN tag 373 of the packet 307 to the acquired internal VID and generates a packet 308 storing a VID 381. Thereafter, the switch device 1 outputs the packet 308 to the storage 3.

Figure 8:
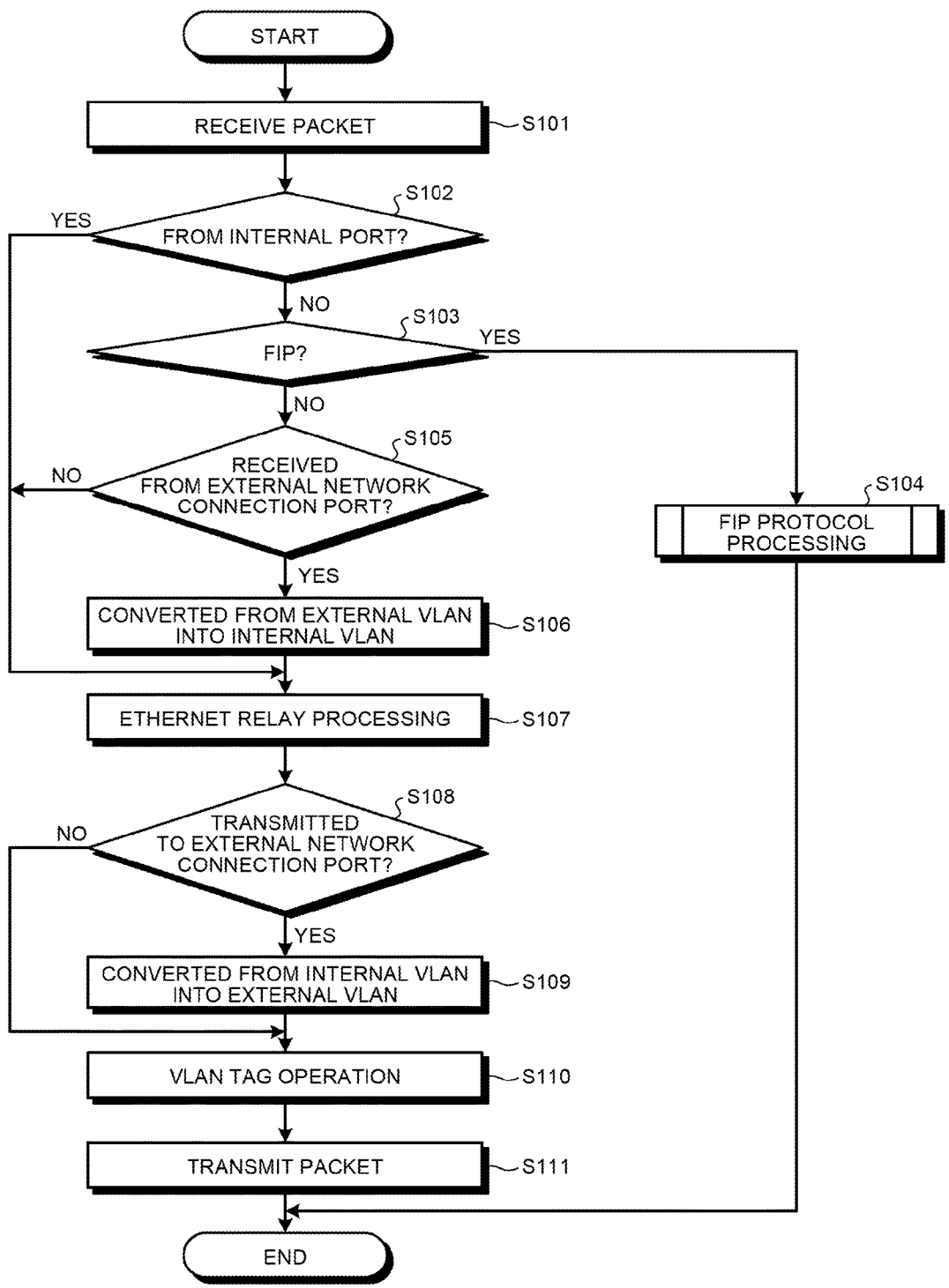
FIG. 8 is a flowchart illustrating packet forwarding processing by the switch device according to the first embodiment.

Next, with reference to FIG. 8, packet forwarding processing of the switch device 1 according to the present embodiment will be described. FIG. 8 is a flowchart illustrating the packet forwarding processing by the switch device according to the first embodiment. Here, in FIG. 8, although processing by the packet processing unit 102 is divided and indicated as a plurality of steps, the packet processing unit 102 may determine the processing with referring to the ACL 104.

The multiplexer 101 receives the packet from the internal port 121 or the reception port 122 (step S101).

The packet processing unit 102 receives, from the multiplexer 101, the header information stored in the packet. Then, the packet processing unit 102 determines whether or not the received packet is input from the internal port 121 (step S102). When the packet is input from the internal port 121 (Yes in step S102), the packet forwarding processing proceeds to step S107.

On the other hand, when the packet is input from the reception port 122 (No in step S102), the packet processing unit 102 determines whether or not the received packet is the FIP (step S103). When the received packet is the FIP (Yes in step S103), the switch device 1 performs FIP protocol processing (step S104). The FIP protocol processing will be described later.

On the other hand, when the received packet is not the FIP (No in step S103), the packet processing unit 102 determines whether or not the received packet is input from an external network connection port which is the reception port 122 connected to the external network 6 (step S105). When the packet is not input from the external network connection port (No in step S105), the packet forwarding processing proceeds to step S107.

On the other hand, when the packet is input from the external network connection port (Yes in step S105), the packet processing unit 102 converts the VLAN tag of the header from the external VLAN into the internal VLAN by using the VLAN conversion table 105 (step S106).

The packet processing unit 102 performs Ethernet relay processing in which the destination MAC address is acquired from the header information stored in the packet (step S107).

Then, the packet processing unit 102 determines, from the destination MAC address, whether or not the received packet is transmitted to the external network connection port (step S108). When the packet is not transmitted to the external network connection port (No in step S108), the packet forwarding processing proceeds to step S110.

On the other hand, when the packet is transmitted to the external network connection port (Yes in step S108), the packet processing unit 102 converts the VLAN tag of the header from the internal VLAN into the external VLAN (step S109).

Then, the packet processing unit 102 outputs the header information to the relay processing unit 103. The relay processing unit 103 outputs the received header information to the packet update unit 108. The packet update unit 108 changes the header information of the packet received from the packet buffer 107 to the header information received from the relay processing unit 103 and performs VLAN tag operation in which the VLAN tag is rewritten (step S110).

The relay processing unit 103 acquires, from the forwarding table 106, the path to the destination MAC address received from the packet processing unit 102. Then, the relay processing unit 103 notifies the demultiplexer 109 of the output port which connects to the acquired path. Furthermore, the packet update unit 108 outputs the received packet to the demultiplexer 109. Then, the demultiplexer 109 transmits the received packet acquired from the packet update unit 108 to the output port designated by the relay processing unit 103 (step S111).

Figure 9:
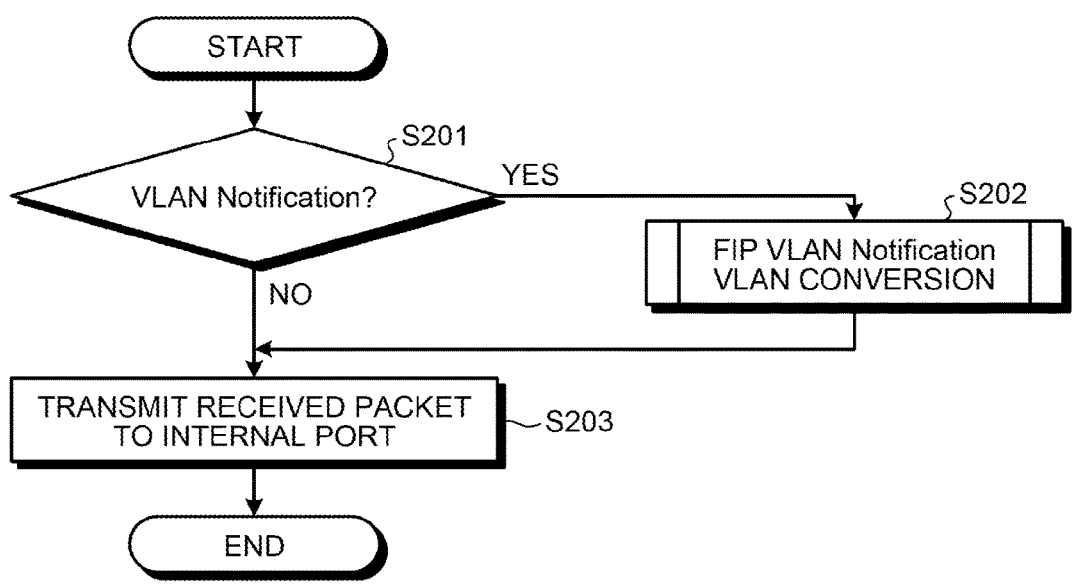
FIG. 9 is a flowchart illustrating FIP protocol processing by the switch device according to the first embodiment.

Next, with reference to FIG. 9, the FIP protocol processing by the protocol processing unit 111 according to the present embodiment will be described. FIG. 9 is a flowchart illustrating the FIP protocol processing by the switch device according to the first embodiment.

The protocol processing unit 111 receives, from the internal port 131, the received packet. Then, the protocol processing unit 111 determines whether or not the received packet is the VLAN Notification (step S201). When the packet is not the VLAN Notification (No in step S201), the protocol processing unit 111 proceeds to step S203.

On the other hand, when the packet is the VLAN Notification (Yes in step S201), the protocol processing unit 111 performs FIP VLAN Notification VLAN conversion (step S202). The FIP VLAN Notification VLAN conversion will be described in detail later.

Then, the protocol processing unit 111 transmits the received packet to the internal port 121 (step S203).

Figure 10:
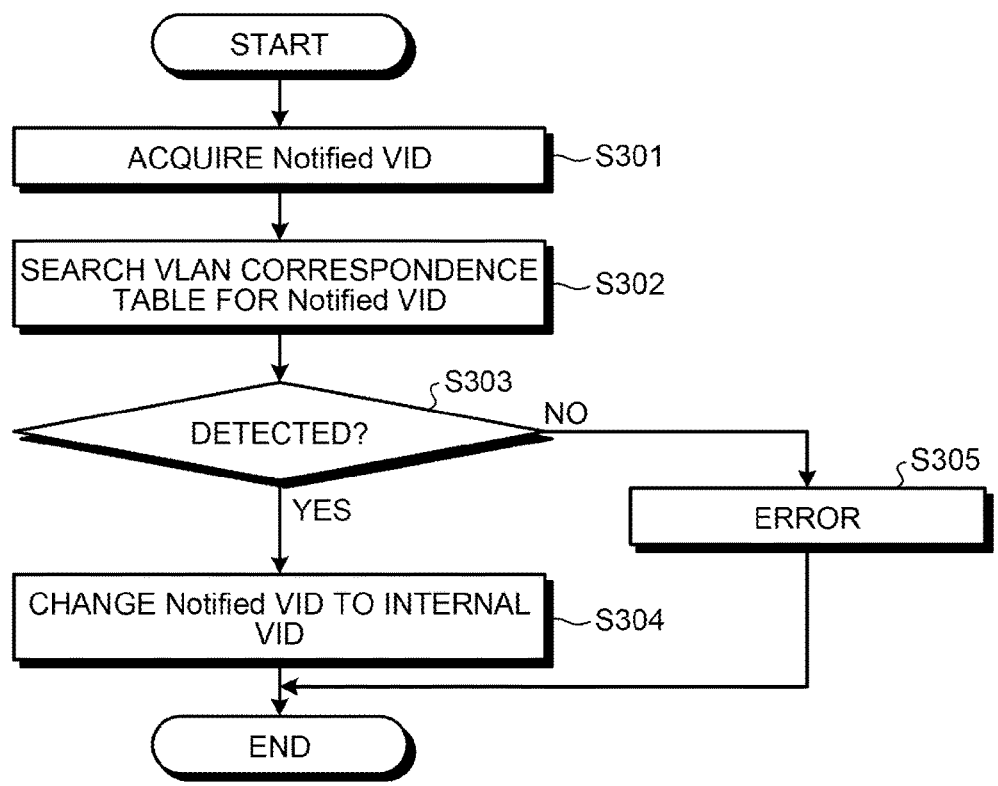
FIG. 10 is a flowchart illustrating FIP VLAN Notification VLAN conversion processing according to the first embodiment.

Next, with reference to FIG. 10, the FIP VLAN Notification VLAN conversion processing by the protocol processing unit 111 according to the present embodiment will be described. FIG. 10 is a flowchart illustrating the FIP VLAN Notification VLAN conversion processing according to the first embodiment.

The protocol processing unit 111 acquires the Notified VID from the received packet which is the VLAN Notification (step S301).

Then, the protocol processing unit 111 searches the VLAN correspondence table 112 for the Notified VID (step S302).

The protocol processing unit 111 determines whether or not the Notified VID has been detected from the VLAN correspondence table 112 (step S303). When the Notified VID has been detected (Yes in step S303), the protocol processing unit 111 converts the Notified VID of the received packet into the internal VID (step S304).

On the other hand, when the Notified VID has not been detected (No in step S303), the protocol processing unit 111 determines that an error occurs (step S305). Then, the switch device 1 informs the manager or the like of the error.

As described above, the switch device according to the present embodiment converts the VID of the external network notified by the VLAN Notification from FCF into the VID of the internal network and notifies the end node. Furthermore, the switch device according to the present embodiment mutually converts the VID of the external network and the VID of the internal network in the communication using the FCoE. Thus, each of the VIDs of the FCoE VLANs in the external network and the internal network can be independently determined, and it is possible to improve the flexibility of the configuration in the internal network. Therefore, it is possible to reduce the burden on the manager in the FCoE communication. Furthermore, a plurality of correspondences between the internal VLAN and the external VLAN can be managed, and it is possible to improve the flexibility of the configuration in the network.

[b] Second Embodiment

Figure 11:
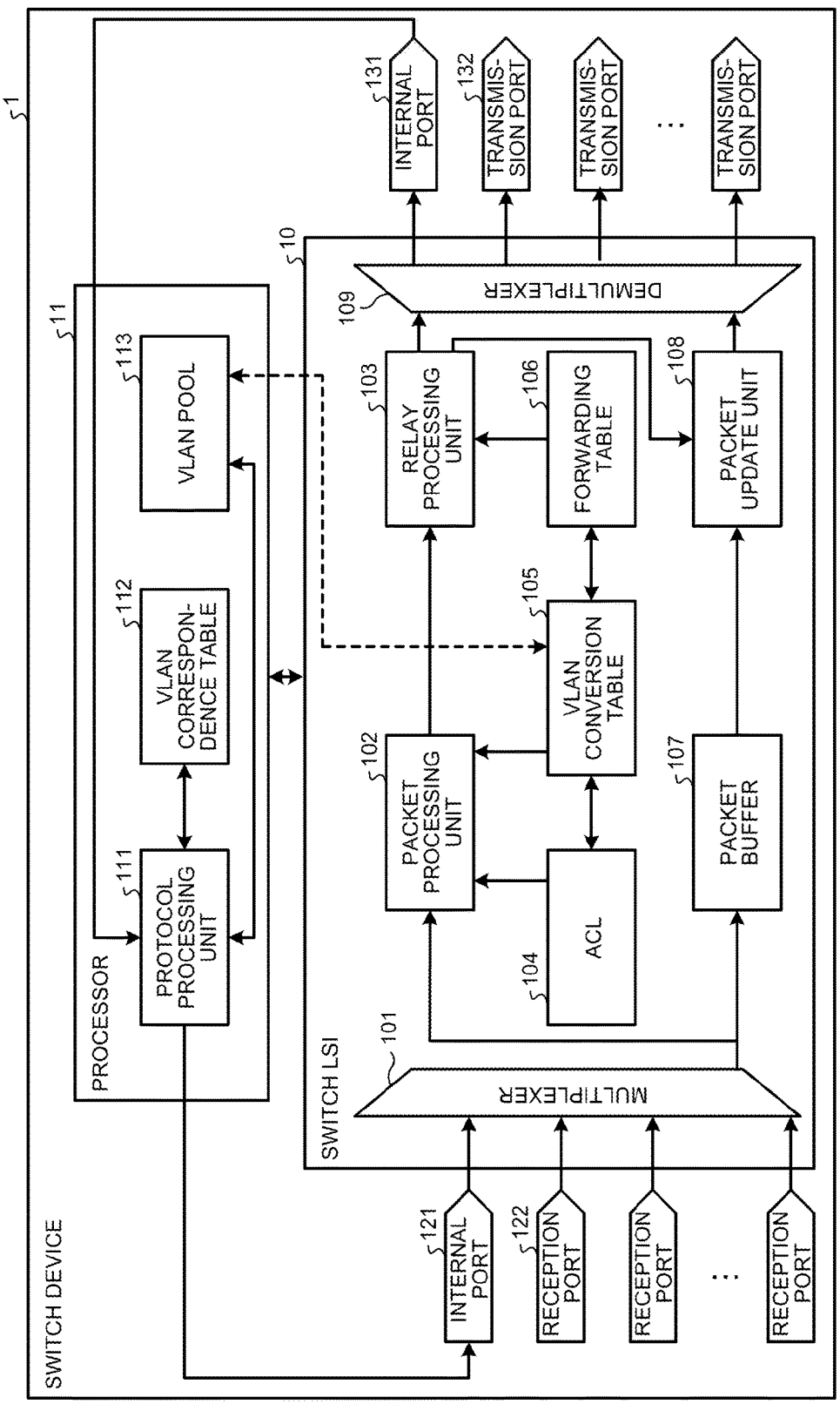
FIG. 11 is a block diagram illustrating a switch device according to a second embodiment.

FIG. 11 is a block diagram illustrating a switch device according to a second embodiment. A switch device 1 according to the present embodiment is different from that of the first embodiment in that the device dynamically assigns an internal VID. Therefore, in the following description, the assignment of the internal VID when a VLAN Notification is received will be mainly described. The switch device according to the present embodiment further includes a VLAN pool 113 in addition to the configuration of the first embodiment. In FIG. 11, it is assumed that each of the parts which have the same reference signs as FIG. 3 has the same function unless particularly described.

FIG. 12A is a diagram describing a usage example of the VLAN pool according to the second embodiment. Furthermore, FIG. 12B is a diagram describing a usage example of a VLAN correspondence table according to the second embodiment.

As illustrated at the left of FIG. 12A, an inactive VLAN and an active VLAN are registered in the VLAN pool 113. The item of the inactive VLAN indicates an unused VID among the VIDs which can be used as the internal VLAN. The item of the active VLAN indicates a VID which has been used among the VIDs which can be used as the internal VLAN. For example, in the VLAN pool 113 illustrated at the left of FIG. 12A, a VIDs 120 and 130 are registered as the inactive VLAN. Furthermore, the VIDs 100 and 110 are registered as the active VLAN. That is, in the state of the VLAN pool 113 illustrated at the right of FIG. 12A, the VIDs 100 and 110 currently are unavailable, and the VIDs 120 and 130 currently are available.

Furthermore, a VLAN correspondence table 112 according to the present embodiment has the items of a type, an internal VLAN, and an external VLAN as illustrated at the right of FIG. 12B. The type indicates that the correspondence between the internal VLAN and the external VLAN is determined statically or dynamically. "Static" in the type indicates that the correspondence is determined statically. That is, when the type is Static, the internal VID corresponding to the external VID has been determined in advance, which is similar to the first embodiment. On the other hand, "Dynamic" in the type indicates that the correspondence is determined dynamically. Therefore, determination processing of the dynamic internal VID will be described below.

A protocol processing unit 111 receives the input of a VLAN Notification packet from an internal port 131. Then, the protocol processing unit 111 acquires the Notified VID indicating the external VLAN from the received VLAN Notification packet. Then, the protocol processing unit 111 determines whether the acquired Notified VID is registered in the item of the external VLAN in the VLAN correspondence table 112. When the acquired Notified VID is registered, the protocol processing unit 111 acquires the corresponding internal VID and changes the Notified VID stored in the VLAN Notification packet to the acquired internal VID.

On the other hand, when the VID of the VLAN Notification is not registered in the VLAN correspondence table 112, the protocol processing unit 111 acquires the VLAN ID from the inactive VLANs stored in the VLAN pool 113. Then, the protocol processing unit 111 erases the acquired VLAN ID from the inactive VLAN in the VLAN pool 113 and moves to the active VLAN.

Figure 12C:
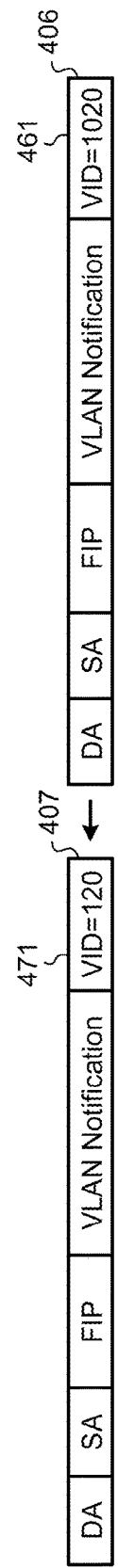
FIG. 12C is a diagram illustrating an example of a VLAN Notification packet to describe a change of a Notified VID according to the second embodiment.

For example, the case where the protocol processing unit 111 acquires 1020 as the Notified VID will be described. FIG. 12C is a diagram illustrating an example of the VLAN Notification packet to describe a change of the Notified VID in the second embodiment.

The protocol processing unit 111 receives a packet 406 illustrated at the right of FIG. 12C. Then, the protocol processing unit 111 acquires 1020 which is a VID 461 stored in the packet 406 as the Notified VID. Then, the protocol processing unit 111 refers to the VLAN correspondence table 112 illustrated at the left of FIG. 12B and confirms that 1020 is not registered in the external VLAN as the VID.

Thus, the protocol processing unit 111 acquires 120 registered as a VID 401 from the inactive VLAN in the VLAN pool 113 illustrated at the left of FIG. 12A. Then, the protocol processing unit 111 erases the VID 401 from the inactive VLAN and moves to the active VLAN. Thus, as illustrated in the VLAN pool 113 at the right of FIG. 12A, 120 is registered as an active VLAN 402 in the VLAN pool 113.

Furthermore, as illustrated in the VLAN correspondence table 112 in the right of FIG. 12B, the protocol processing unit 111 registers Dynamic as a type 403, 120 as an internal VLAN 404, and 1020 as an external VLAN 405. Thus, the correspondence, which is determined dynamically by the protocol processing unit 111, between the internal VLAN and the external VLAN is registered in the VLAN correspondence table 112.

Thereafter, the protocol processing unit 111 reflects the updated contents of the VLAN correspondence table 112 in a VLAN conversion table 105 of an LSI 10.

Furthermore, the protocol processing unit 111 rewrites the VID 461 of the packet 406 of FIG. 12C to 120 which is the VID of the acquired internal VLAN. Thus, the protocol processing unit 111 generates a packet 407 which stores the Notified VID in which a VID 471 has 120 as the VID.

Next, with reference to FIG. 13, FIP VLAN Notification VLAN conversion processing according to the present embodiment will be described. FIG. 13 is a flowchart illustrating the FIP VLAN Notification VLAN conversion processing according to the second embodiment.

The protocol processing unit 111 acquires the Notified VID from the received packet which is the VLAN Notification (step S401).

Then, the protocol processing unit 111 searches the VLAN correspondence table 112 for the Notified VID (step S402).

The protocol processing unit 111 determines whether or not the Notified VID has been detected from the VLAN correspondence table 112 (step S403). When the Notified VID has been detected (Yes in step S403), the protocol processing unit 111 proceeds to step S406.

On the other hand, when the Notified VID has not been detected (No in step S403), the protocol processing unit 111 acquires the VID of the internal VLAN from the inactive VLANs in the VLAN pool 113 (step S404).

Then, the protocol processing unit 111 registers Dynamic in the type and further registers the correspondence between the VID of the internal VLAN and the VID of the external VLAN in the VLAN correspondence table 112 (step S405).

Thereafter, the protocol processing unit 111 changes the Notified VID to the VID of the internal VLAN (step S406).

As described above, the switch device according to the present embodiment can dynamically assign the internal VLAN to the external VLAN designated by the FCF. Thus, when the FCoE VLAN of the internal network has not been concretely determined in advance, the internal VLAN can be automatically assigned to the external VLAN, and it is possible to reduce the burden on the internal network manager.

Furthermore, by determining the range of the VID to be used in the internal FCoE VLAN in advance, the VID of the FCoE VLAN can be determined so as not to interfere with other VLAN definition. Thus, the network is securely managed and the VLAN is used in a predictable range, and it is possible to reduce the burden on the internal network manager.

[c] Third Embodiment

Figure 14:
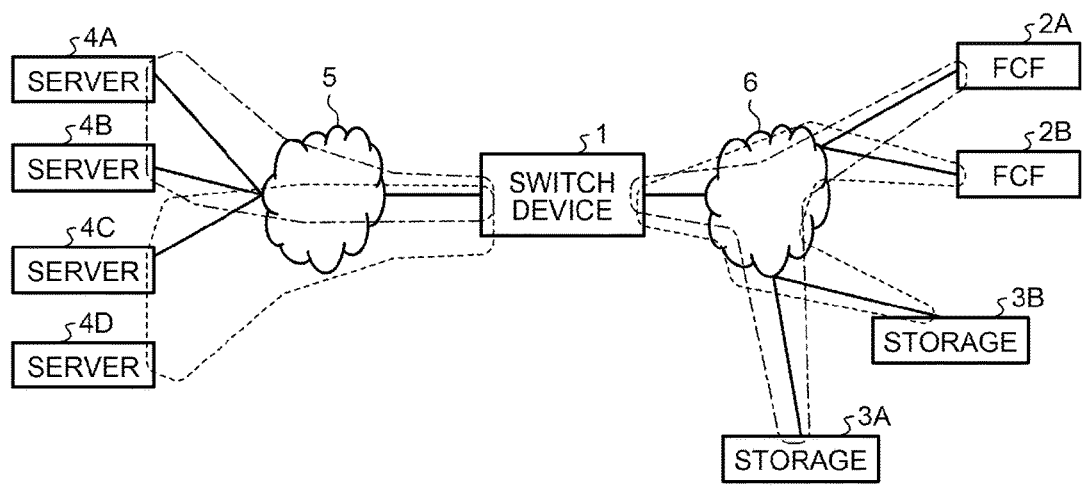
FIG. 14 is a diagram illustrating a schematic configuration of a network system according to a third embodiment.

FIG. 14 is a diagram illustrating a schematic configuration of a network system according to a third embodiment. A switch device according to the present embodiment is different from the second embodiment in that the device assigns an internal VID in a predetermined range to a particular MAC address. Therefore, in the following description, the assignment of the internal VID when a VLAN Notification is received will be mainly described. FIG. 11 also illustrates a block diagram of a switch device 1 according to the present embodiment. In FIG. 11, it is assumed that each of the parts which have the same reference signs as the second embodiment has the same function unless particularly described.

As illustrated in FIG. 14, the network system according to the present embodiment associates end nodes with an internal VLAN and an external VLAN. More specifically, the internal VLAN and the external VLAN which are associated with the end nodes encircled with alternate long and short dash lines are used. That is, servers 4A and 4B, an FCF 2A, and a storage 3A use the same VLAN. Furthermore, the VLAN different from the VLAN encircled with the alternate long and short dash lines is used between the end nodes encircled with broken lines. That is, servers 4C and 4D, an FCF 2B, and a storage 3B use the associated internal VLAN and external VLAN. In this manner, in the network system according to the present embodiment, the VLAN used by the particular end nodes is limited.

Therefore, a VLAN pool 113 according to the present embodiment is the VLAN pool 113 illustrated in FIG. 15A. FIG. 15A is a diagram illustrating an example of the VLAN pool according to the present embodiment. That is, in the VLAN pool 113, a plurality of VIDs of the inactive VLAN corresponds to each MAC address. Thus, a VID among the internal VIDs in the predetermined range is assigned to the end node having a particular MAC address. Here, the columns of the active VLAN are simply filled with the used VID in order from the top without being associated with the MAC address to indicate the used VID in the present embodiment. However, the active VLAN may be written so as to be associated with the MAC address.

FIG. 15B is a diagram illustrating an example of a VLAN correspondence table according to the present embodiment. In a VLAN correspondence table 112 according to the present embodiment, the correspondence between the internal VLAN and the external VLAN is registered to be associated with the MAC address. Here, a fabric provided MAC address (FPMA) in the VLAN correspondence table 112 is assigned by an FCF 2 to perform the FCoE communication.

For example, a protocol processing unit 111 receives a packet 506 illustrated at the right of FIG. 15C. FIG. 15C is a diagram illustrating an example of a VLAN Notification packet to describe a change of a Notified VID according to the third embodiment. Then, the protocol processing unit 111 acquires, from the packet 506, a Notified VID 562 corresponding to the external VLAN.

Next, the protocol processing unit 111 searches the VLAN correspondence table 112 for the acquired Notified VID. When the acquired Notified VID is not registered in the VLAN correspondence table 112, the protocol processing unit 111 acquires a destination MAC address 561 from the packet 506.

Then, the protocol processing unit 111 selects the VID from the VIDs of the inactive VLAN corresponding to the destination MAC address in the VLAN pool 113. For example, when the destination MAC address is 00-00-0E-11-22-02, the protocol processing unit 111 acquires 150 from the VIDs of the corresponding inactive VLAN.

Then, the protocol processing unit 111 erases 150 from the inactive VLAN and moves 150 to the active VLAN.

Thereafter, as illustrated in FIG. 15B, the protocol processing unit 111 registers 00-00-0E-11-22-02 as a MAC address 501 in the VLAN correspondence table 112. The protocol processing unit 111 further registers Dynamic as a type 503. Then, the protocol processing unit 111 registers 150 which is the VID acquired from the VLAN pool 113 as an internal VLAN 504 and further registers the VID stored in an external VLAN 505 as the Notified VID. Here, in an FPMA 502, "φ" indicating no registration is written. The FPMA is transmitted from the FCF 2 in the subsequent login processing to a fabric and registered in the VLAN correspondence table 112 by the protocol processing unit 111 at that time.

Then, the protocol processing unit 111 changes the Notified VID 562 of the packet 506 to the acquired value 150. Thus, the protocol processing unit 111 generates a packet 507 in which a Notified VID 571 is stored, as illustrated at the left of FIG. 15C.

The protocol processing unit 111 outputs the generated packet 507 to an internal port 121. Furthermore, the protocol processing unit 111 reflects the updated contents of the VLAN correspondence table 112 in a VLAN conversion table 105 of an LSI 10.

Figure 16:
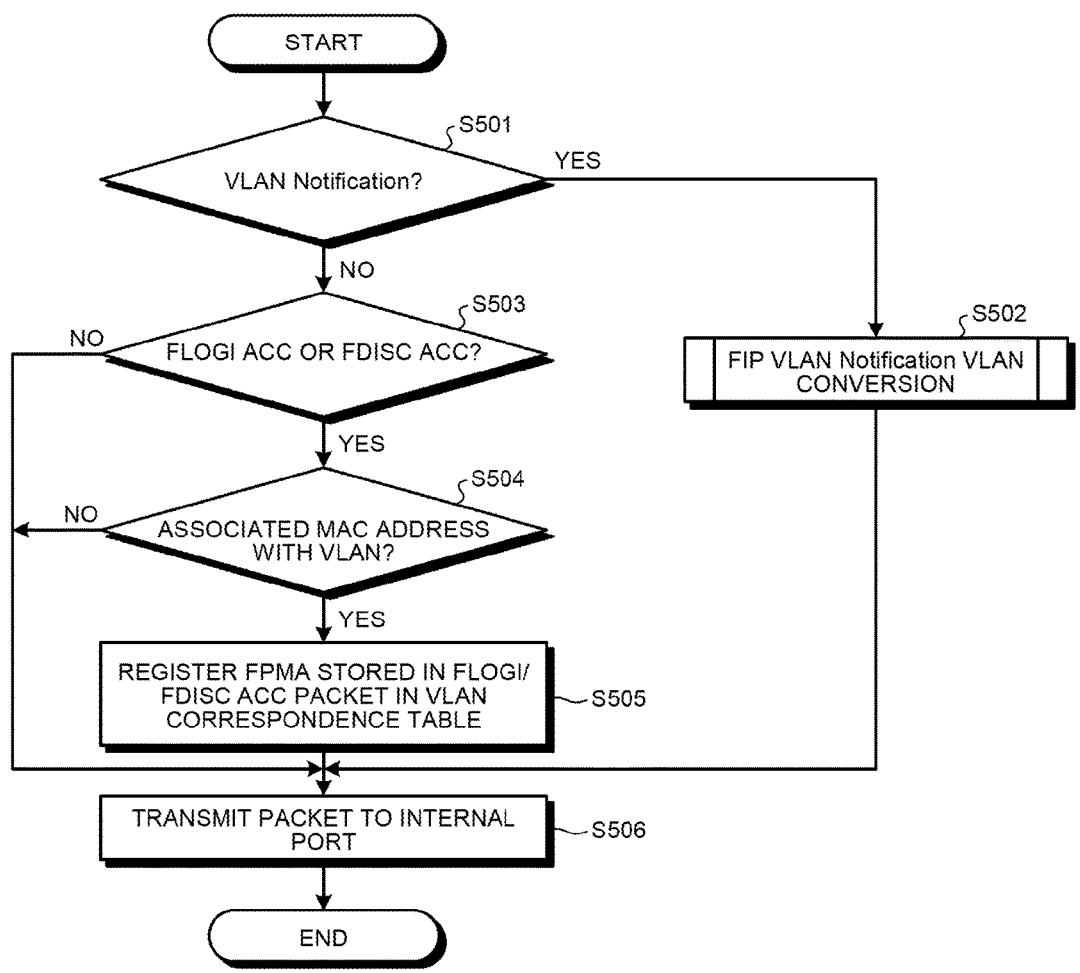
FIG. 16 is a flowchart illustrating FIP protocol processing by a switch device according to the third embodiment.

Next, with reference to FIG. 16, FIP protocol processing by the switch device 1 according to the present embodiment will be described. FIG. 16 is a flowchart illustrating the FIP protocol processing by a switch device according to the third embodiment. In FIG. 16, the case, where the end node which associates the MAC address with the VLAN and the end node which does not associate the MAC address with the VLAN coexist, will be described.

The protocol processing unit 111 receives the packet from an internal port 131. Then, the protocol processing unit 111 determines whether or not the packet is the VLAN Notification (step S501). When the packet is the VLAN Notification (Yes in step S501), the protocol processing unit 111 performs FIP VLAN Notification VLAN conversion (step S502). The FIP VLAN Notification VLAN conversion according to the present embodiment will be described in detail later.

On the other hand, when the packet is not the VLAN Notification (No in step S501), the protocol processing unit 111 determines whether the packet is an FLOGI accept (ACC) or an FDISC ACC (step S503). When the packet is neither the FLOGI accept (ACC) nor the FDISC ACC (No in step S503), the protocol processing unit 111 proceeds to step S506.

On the other hand, when the packet is either of the FLOGI accept (ACC) or the FDISC ACC (Yes in step S503), the protocol processing unit 111 determines whether or not the MAC address has been associated with the VLAN (step S504). When the MAC address has not been associated (No in step S504), the protocol processing unit 111 proceeds to step S506.

On the other hand, when the MAC address has been associated (Yes in step S504), the protocol processing unit 111 registers the FPMA stored in the packet of the FLOGI ACC or the FDISC ACC in the FPMA column of the VLAN correspondence table 112 (step S505).

Thereafter, the protocol processing unit 111 transmits the packet to the internal port 121 (step S506).

Figure 17:
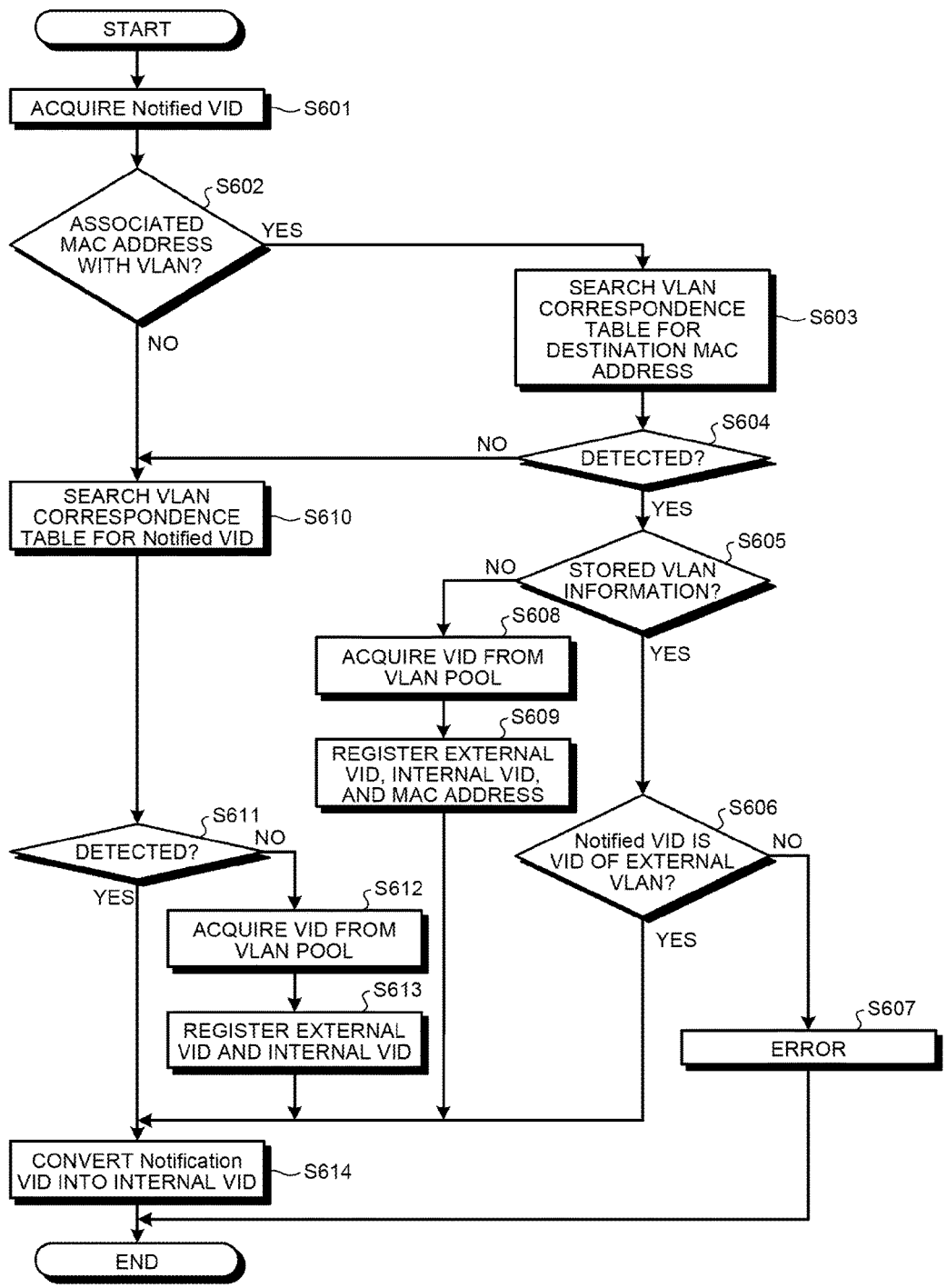
FIG. 17 is a flowchart illustrating the FIP VLAN Notification VLAN conversion processing according to the third embodiment.

Next, with reference to FIG. 17, FIP VLAN Notification VLAN conversion processing by the protocol processing unit 111 according to the present embodiment will be described. FIG. 17 is a flowchart illustrating the FIP VLAN Notification VLAN conversion processing according to the third embodiment. In FIG. 17, the case, where the end node which associates the MAC address with the VLAN and the end node which does not associate the MAC address with the VLAN coexist, will be described.

The protocol processing unit 111 acquires the Notified VID from the received packet which is the VLAN Notification (step S601).

The protocol processing unit 111 determines whether or not the MAC address is to be associated with the VLAN (step S602). When the MAC address is to be associated with the VLAN (Yes in step S602), the protocol processing unit 111 acquires the destination MAC address from the received packet and searches the VLAN correspondence table 112 for the acquired destination MAC address (step S603).

Then, the protocol processing unit 111 determines whether or not the acquired destination MAC address has been detected from the VLAN correspondence table 112 (step S604). When the destination MAC address has not been detected from the VLAN correspondence table 112 (No in step S604), the protocol processing unit 111 proceeds to step S610.

On the other hand, when the destination MAC address has been detected from the VLAN correspondence table 112 (Yes in step S604), the protocol processing unit 111 determines whether or not the VLAN information has been stored in the VLAN correspondence table 112 (step S605). When the VLAN information has been stored in the VLAN correspondence table 112 (Yes in step S605), the protocol processing unit 111 determines whether or not the Notified VID is the external VID (step S606).

When the Notified VID is not the external VID (No in step S606), the protocol processing unit 111 detects error occurrence (step S607). Then, the protocol processing unit 111 informs a manager or the like of the error occurrence.

On the other hand, when the Notified VID is the external VID (Yes in step S606), the protocol processing unit 111 proceeds to step S614.

Alternatively, the VLAN information has not been stored (No in step S605), the protocol processing unit 111 acquires, from the VLAN pool 113, the VID from the VIDs of the inactive VLAN corresponding to the MAC address (step S608).

Then, the protocol processing unit 111 registers the external VID, the internal VID, and the MAC address in the VLAN correspondence table 112 (step S609).

On the other hand, when the MAC address is not to be associated with the VLAN (No in step S602), the protocol processing unit 111 searches the VLAN correspondence table 112 for the Notified VID (step S610).

Then, the protocol processing unit 111 determines whether or not the Notified VID has been detected from the VLAN correspondence table 112 (step S611). When the Notified VID has been detected from the VLAN correspondence table 112 (Yes in step S611), the protocol processing unit 111 proceeds to step S614.

On the other hand, when the Notified VID has not been detected from the VLAN correspondence table 112 (No in step S611), the protocol processing unit 111 acquires the internal VID from the inactive VLAN in the VLAN pool 113 (step S612).

Then, the protocol processing unit 111 registers Dynamic in the type and further registers the correspondence between the internal VID and the external VID in the VLAN correspondence table 112 (step S613).

Then, the protocol processing unit 111 changes the Notified VID to the internal VID (step S614).

As described above, the switch device according to the present embodiment can assign the VLAN in the predetermined range for each end node. Thus, by setting the VLAN for each end node, it is possible to improve the security and change the quality of the service for each user.

Furthermore, in the above description, the processor 11 associates the internal VLAN with the external VLAN, and the switch LSI performs the VID tag conversion in the FCoE communication. However the processing is not limited to these, and for example, the switch LSI may perform both of the processing.

According to an aspect of a switch device and a control method of the switch device disclosed in the present application can reduce a burden on a manager.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A switch device which relays communication between a first device disposed in a first network and a second device disposed in a second network in order for data in accordance with a first communication technology to be transmitted and received on a network in accordance with a second communication technology, the switch device comprising:
   a switch large scale integration (LSI), a plurality of reception ports, and a plurality of transmission ports,
   each of the reception ports is connected to either the first network or the second network and receives data from the first device or the second device,
   each of the transmission ports is connected to either the first network or the second network and transmits data to the first device or the second device, the LSI configured to:
   receive a signal from the first device;
   determine whether or not the signal is a Fiber Channel over Ethernet Initialization Protocol (FIP) Virtual Local Area Network (VLAN) request;
   send, when the signal is the FIP VLAN request, a transmission request to the second device;
   receive, from the second device, information of a second virtual network in the second network in response to the transmission request for information of a virtual network used in the communication;
   select a first virtual network, corresponding to the second virtual network, in the first network;
   notify the first device of information of the first virtual network selected as information of a virtual network used in the communication; and
   rewrite, when the signal is not the FIP VLAN request, information of a virtual network, stored in data received from the first device by using the reception port, from information of the first virtual network to information of the second virtual network, forward the rewritten data to the second device by using the transmission port, rewrite information of a virtual network, stored in data received from the second device by using the reception port, from information of the second virtual network to information of the first virtual network, and forward the rewritten data to the first device by using the transmission port.

2. The switch device according to claim 1, wherein
the first communication technology is a communication using a fiber channel, and
the second communication technology is an Ethernet communication.

3. The switch device according to claim 1, wherein the switch LSI stores in advance a corresponding relation between the first virtual network and the second virtual network and selects information of the first virtual network corresponding to the second virtual network received.

4. The switch device according to claim 1, wherein the switch LSI stores information of a plurality of virtual networks in the first virtual network and selects information of the first virtual network from the stored plurality of virtual networks.

5. The switch device according to claim 4, wherein
the first device includes a plurality of first devices,
the switch LSI receives, from the second device, information of a destination first device for which the information of the second virtual network is destined, and stores the information of the plurality of virtual networks in the first network for each of the plurality of first devices and selects the information of the first virtual network from the plurality of virtual networks corresponding to the destination first device.

6. A control method of a switch device, the control method comprising:
receiving a signal from a first device disposed in a first network;
determining whether or not the signal is a FIP VLAN request which is a request for information of a virtual network used in communication in order for data in accordance with a first communication technology to be transmitted and received on a network in accordance with a second communication technology;
sending, when the signal is the FIP VLAN request, a transmission request to a second device disposed in a second network;
receiving, from the second device, information of a second virtual network in the second network in response to the transmission request;
selecting a first virtual network, corresponding to the second virtual network, in the first network;
notifying the first device of information of the selected first virtual network as information of a virtual network used in the communication; and
relaying, when the signal is not the FIP VLAN request, the communication between the first device and the second device based on the first virtual network and the second virtual network.

* * * * *